Figure 2:
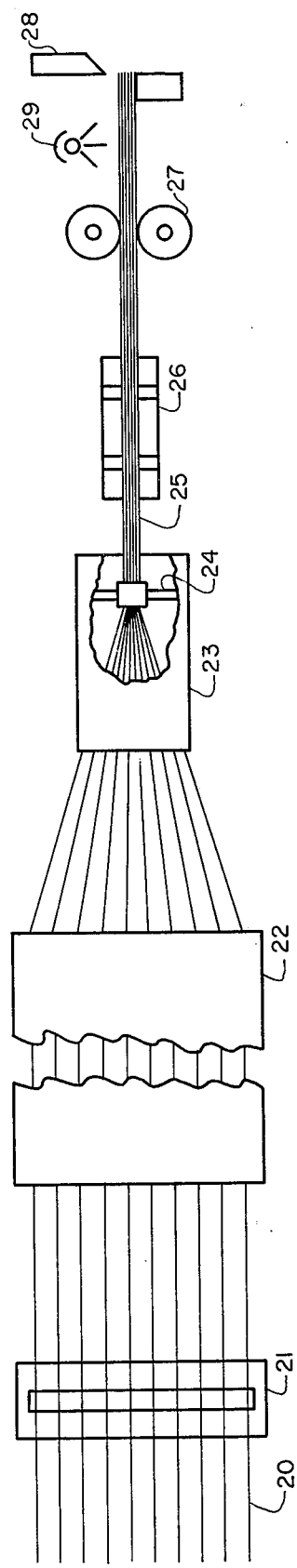

United States Patent [19]

Hattori et al.

[11] 4,037,011

[45] July 19, 1977

[54] GLASS FIBER REINFORCED THERMOPLASTIC COMPOSITION AND PROCESS FOR ITS PREPARATION

[75] Inventors: Kiyoshi Hattori; Edward L. Lowery; William H. Chadbourne; William M. Boyer, all of Evansville, Ind.

[73] Assignee: Dart Industries Inc., Los Angeles, Calif.

[21] Appl. No.: 553,962

[22] Filed: Feb. 28, 1975

Related U.S. Application Data

[60] Continuation of Ser. No. 226,418, Feb. 15, 1972, abandoned, which is a division of Ser. No. 48,892, June 15, 1970, abandoned, which is a continuation of Ser. No. 677,969, Sept. 25, 1967, abandoned.

[51] Int. Cl.$^2$ .................. B32B 5/16; D02G 3/36; B44D 1/02; C08F 1/84
[52] U.S. Cl. .................. 428/294; 260/42.18; 264/171; 264/261; 427/221; 428/392; 428/398; 428/402
[58] Field of Search ............... 264/261, 171; 428/294, 428/295, 397, 402, 378, 392, 398; 260/42.15, 42.18; 427/221

[56] References Cited

U.S. PATENT DOCUMENTS

| | | | |
|---|---|---|---|
| 2,877,501 | 3/1959 | Bradt | 264/143 |
| 3,022,210 | 2/1962 | Phillipps | 156/180 |
| 3,119,718 | 1/1964 | Bradt | 118/68 |
| 3,143,405 | 8/1964 | Wong | 65/3 |
| 3,220,905 | 11/1965 | Doob et al. | 156/180 |
| 3,272,897 | 9/1966 | Herman et al. | 264/109 |
| 3,278,329 | 10/1966 | Wiczer | 427/220 |
| 3,403,069 | 9/1968 | Benson | 428/371 |
| 3,598,693 | 8/1971 | Anderson et al. | 260/37 |
| 3,635,752 | 1/1972 | Baer et al. | 428/378 |
| 3,671,378 | 6/1972 | Baer et al. | 428/378 |

*Primary Examiner*—William J. Van Balen
*Attorney, Agent, or Firm*—Arthur S. Collins; Fred S. Valles; Bryant W. Brennan

[57] ABSTRACT

Novel injection molding fiberglass reinforced thermoplastic concentrate granules are prepared by a process wherein continuous multifilament glass strands are impregnated with from 10 to 30 percent by weight of thermoplastic resin and, while the strand is maintained under controlled temperature conditions, the impregnated strand is cut to lengths of at least ⅛ of an inch.

13 Claims, 2 Drawing Figures

U.S. Patent  July 19, 1977  4,037,011

Kiyo Hattori
Edward L. Lowery
William H. Chadbourne
William M. Boyer

INVENTORS

BY Fred S. Valles

ATTORNEY

GLASS FIBER REINFORCED THERMOPLASTIC COMPOSITION AND PROCESS FOR ITS PREPARATION

This is a continuation, of application Ser. No. 226,418 filed 2/15/72 now abandoned which is a division of Ser. No. 48,892, filed June 15, 1970 now abandoned, which in turn was a continuation of Ser. No. 677,969, filed Sept. 25, 1967 and since abandoned.

FIELD OF INVENTION

This invention relates to new compositions of matter comprising fiberglass reinforced thermoplastic resins and more particularly to the art of manufacturing fiberglass reinforced injection molding granule concentrates. The invention also provides a new process for manufacture of fiberglass reinforced thermoplastic resin concentrates all as more fully set forth hereinbelow.

The Prior Art

Injection molding glass fiber reinforced thermoplastic resins have, within the past decade, enjoyed a rapid growth because of their superior physical properties as compared to their unreinforced couterparts. Brittle resins like homopolymer styrene (crystal or general purpose) have, for example, been improved in kind and have found uses in fields which had hitherto not been open to such resins. Reinforcing with glass fibers thus, generally at least doubles tensile strength, improves both low and room temperature impact strengths, increases stiffness, decreases cold flow and coefficient of thermal expansion, increases heat resistance and improves other properties so that such improved properties approach the properties of some metals.

The following Table illustrates the improvement obtained upon fiberglass reinforcement of unmodified thermoplastic resin and compares the resultant properties with those of certain common metals.

unreinforced nylon to 500° F for fiberglass reinforced nylon while the linear coefficient of thermal expansion is reduced from $4.5 \times 10^{-5}$ inches per inch in °F to $1.4 \times 10^{-5}$ inches per inch in °F. The low elongation, high tensile modulus and low linear coefficient of thermal expansion properties which result from fiberglass reinforcement of thermoplastic resins yield properties quite comparable to those of the three principal metals used for die-casting as illustrated in the far right-hand columns in the Table. Similar increases in the strength properties of polystyrene and high density polyethylene result from the fiberglass reinforcement of these thermoplastics as illustrated in the Table.

Fiberglass reinforced injection molding compositions of the type illustrated in the foregoing Table have been described and claimed in U.S. Pat. No. 2,877,501 to R. Bradt, said Patent describing compositions consisting from of from 15 to 60 per cent by weight of glass fiber, the remainder being the resin. The properties of the fiberglass reinforced thermoplastics prepared from the teachings of U.S. Pat. No. 2,877,501 are the highest properties to be found among fiberglass reinforced thermoplastics.

In addition to the technology illustrated in the Bradt Patent there are other methods of preparing glass reinforced thermoplastics. A material commonly referred to in the Industry as "short fiberglass" reinforced thermoplastics may be prepared by feeding fiberglass pre-chopped into short, approximately ¼ inch, lengths together with thermoplastic to the feed pocket of a plastic extruder and co-extruding the mixture of fiberglass and thermoplastic as strands, subsequently cutting these strands into small pellets suitable for injection molding. The products produced by this method contain glass fibers dispersed within the granule, but normally the fibers are of an extremely short length, commonly between 0.02 inches to 0.07 inches, despite the fact that much longer glass fibers are fed to the extruder. The

TABLE I

| Property | Unit | ASTM Test | Unreinforced Nylon 6,6 | 40% fiberglass reinforced nylon 6,6 | Unreinforced Polystyrene | 35% fiberglass reinforced Polystyrene | Unreinforced Polyethylene (high density) | 40% fiberglass reinforced Polyethylene |
|---|---|---|---|---|---|---|---|---|
| Tensile Strength | PSI | D638-61T | 11,800 | 30,000 | 7,500 | 15,000 | 4,200 | 11,000 |
| Elongation | % | D638-61T | 60 | 2.2 | 3.0 | 1.2 | 800 | 3.5 |
| Tensile Modulus | PSI×105 | D638-61T | 4.5 | 20 | 4.6 | 19 | 1.4 | 9.0 |
| Izod Impact | Ft.lbs/in. | D256-56 | 1.0 | 3.4 | 0.5 | 2.2 | 2.0 | 4.0 |
| Deflection Temp. Under Load at 264 psi | °F | D648-56 | 150 | 500 | 180 | 220 | 175 | 260 (at 66 psi) |
| Linear Coefficient of Termal Expansion | In/in °F | D696-44 | $4.5 \times 10^{-5}$ | $1.4 \times 10^{-5}$ | $4 \times 10^{-5}$ | $1.8 \times 10^{-5}$ | $6 \times 10^{-5}$ | $1.7 \times 10^{-5}$ |

As illustrated in Table I, reinforcement of nylon 6—6 with 40% of fiberglass increases the tensile strength from 11,800 psi to 30,000. While the elongation is reduced from 60% to 2.2% and tensile modulus is increased from 250,000 psi to 2,000,000, also as noted, the Izod impact strength is improved dramatically from 1.0 ft. lbs./in. for unreinforced nylon to 3.4 ft. lbs./in. for reinforced nylon. The deflection temperature under load, at 264 psi, is dramatically raised from 150° F for fiber length reduction is caused by the extensive grinding action which takes place among the hard thermoplastic pellets and fiberglass as the mixture is compressed in the feed screw of the extruder. The ultimate physical properties of these so-called "short glass" reinforced thermoplastics are not equivalent to those known as the "long glass" reinforced thermoplastics. This non-equivalence is illustrated by a comparison of the physical properties shown in the following Table.

TABLE II

| Property | ASTM Test | Long Glass Nylon 6-6 40% glass | Short Glass Nylon 6-6 40% glass | Long Glass Polystyrene 30% glass | Short Glass Polystyrene 30% glass |
|---|---|---|---|---|---|
| Tensile strength at 73° F. psi | D638-61T | 30,000 | 24,000 | 14,000 | 11,000 |
| Flexural Modulus at 73° F psi × 105 | D790-63 | 18.0 | 15.0 | 12.0 | 10.0 |

TABLE II-continued

| Property | ASTM Test | Long Glass Nylon 6-6 40% glass | Short Glass Nylon 6-6 40% glass | Long Glass Polystyrene 30% glass | Short Glass Polystyrene 30% glass |
|---|---|---|---|---|---|
| Izod Impact 73° F Ft.lb./In. | D256-56 | 3.4 | 1.4 | 2.5 | 0.5 |
| Deflection Temp. under load at 264 psi ° F. | D648-56 | 500 | 480 | 220 | 210 |

As can be seen from the data in Table II, short glass reinforced nylon yields maximum tensile strengths of only 24,000 psi while long glass reinforced nylon yields tensile strengths of 30,000 psi. Similarly the Izod impact strengths of the short glass products are considerable below those of the long glass counterparts. For example, short glass nylon yields an Izod impact strength of only 1.4 ft. lb./in. while long glass reinforced nylon yields an Izod impact strength of 3.4 ft. lbs./in. The discrepancy between long and short glass reinforced polystyrenes is even more dramatic. Short glass polystyrenes have an impact strength of only 0.5 ft. lb./in. while long glass reinforced polystyrenes have an impact strength of 2.5 ft. lb./in.

Since the short glass reinforced thermoplastic resins described above can be prepared by simple extrusion compounding, a logical extension of this process arose in Industry. This extension consisted of feeding chopped fiberglass and non-reinforced thermoplastic resin directly to the hopper of a reciprocating screw type of injection molding machine. Thus, the extrusion compound is carried out within the screw injection molding machine which also molds the ultimate fabricated part. The products produced by this process are similar in properties to the short glass reinforced thermoplastics mentioned above.

Two similar methods of practicing the art of manufacturing short glass reinforced thermoplastic resins exist at present in Industry. One method relates the feeding of pre-chopped fiberglass and non-reinforced thermoplastic in separate streams to the hopper of the screw injection molding machine while the second method concerns the chopping of continuous strand fiberglass roving directly above the injection molding machine hopper and the freshly chopped glass is mixed in the hopper with non-reinforced thermoplastic resin.

Regardless of how the fiberglass is fed to the molding machine hopper, both of these systems fail to adequately disperse the fiberglass within the plastic resin and often lead to the formation of clumps of fiberglass and resin-rich areas in the molded part. Formation of clumps and/or resin-rich areas leads to erratic and non-uniform physical properties throughout the molded piece. Fiberglass clumps also have a tendency to collect on the surface of the molded articles interferring with subsequent operations such as painting, vacuum metalizing, or plating. Further in operation involving the second method described above chopping of continuous strand fiberglass roving produces large amounts of extremely fine fiberglass which tends to float through the air constituting a major housekeeping problem and health hazard.

Despite the fact the chopped fiberglass which is fed with the unreinforced resin to the injection molding machine hopper has been coated with one or two per cent of a binder resin, the glass is essentially bare and causes severe wear of both the cylinder and screw in the molding machine as it is compounded with thermoplastic. This severe wear problem has been widely experienced in the Plastics Industry.

It should be briefly indicated here that certain binder resins are put on fiberglass by the fiberglass manufacturer to facilitate the handling of the continuous fiberglass roving and its subsequent chopping into short lengths. The choice of these binder resins is made to facilitate handling and often the resins are incompatible with a thermoplastic into which the fiberglass is subsequently incorporated. Such incompatibility leads to poor physical properties as a result of the non-wetting of the fiberglass surface by the thermoplastic resin. Fiberglass manufacturers apply one to two per cent of binder resin to the surface of the fiberglass as common practice, although the literature mentions higher percentages.

In order to summarize the above, the fiberglass reinforced thermoplastic materials which are available commercially as a result of the prior art consist of the superior physical property materials prepared by employing long glass fibers, the short glass fiber materials prepared by extrusion compounding, and those products prepared by the direct mixing of fiberglass and thermoplastic in a screw injection molding machine.

The economics of mixing fiberglass and thermoplastics directly in an injection molding machine are most attractive since no further processing steps are required. However, the serious disadvantages of the direct mix techniques enumerated above have prevented its widespread acceptance by Industry. Moreover, the amount of fiberglass which can be incorporated in such a direct mix technique is seriously limited. In order to gain even further wide-spread acceptance throughout Industry, reinforced thermoplastics must be available at minimal cost. The attractive economics of the direct mixing of fiberglass and thermoplastic in the injectiom molding machine hopper would lead to such further wide-spread acceptance were it not for the serious drawbacks of this process. Prior art has not shown a route to economics competitive with the direct mixing of glass and thermoplastic in an injection molding machine.

In summary, the direct mix system provides the most competitive economics but has unacceptable disadvantages. The teachings of the Bradt Patent provide the best possible physical properties but do not permit manufacture of a product economically competitive with the direct mix system.

SUMMARY OF THE INVENTION

It is an object of this invention to prepare a novel concentrate of long fiberglass in a thermoplastic resin which can be mixed at an injection molding machine hopper with non-reinforced thermoplastic with resultant economics competitive with the direct mixing of bare fiberglass and thermoplastic resin.

It is a further object of this invention to provide a novel concentrate of long fiberglass suitably impregnated with a thermoplastic resin so as to minimize the wear in an injection molding machine.

It is a further object of this invention to prepare a novel concentrate a long fiberglass impregnated with a thermoplastoc resin of the same type as and chosen to be compatible with the non-reinforced thermoplastic resin with which it is ultimately intended to be mixed in the injection molding machine.

It is a further object of this invention to provide a novel concentrate of long fiberglass impregnated with a thermoplastic resin in the form of a granule possessing such physical properties as to be easily handleable in existing injection molding equipment.

It is a further object of this invention to provide an injection molding granule which contains substantially all its long fiberglass filament content in a substantially parallel direction for substantially the entire length of the granule.

It is yet another object of this invention to provide a process for preparing a high glass content long fiberglass reinforced thermoplastic resin.

It is yet another object of this invention to provide a process for preparing injection molding pellets containing a high concentration of glass filaments in a substantially parallel direction to one of the sides (longitudinal) of the pellet and extending substantially through the entire length of the pellet.

The foregoing objects of this invention are accomplished by the provision hereof of a rigid fiberglass reinforced thermoplastic injection molding granule comprising a thermoplastic resin incorporating a multiplicity of glass filaments which are substantially surrounded and bonded by said thermoplastic resin, said granule being resistant to splitting and having glass filaments extending predominantly throughout the length of the granule and in substantially parallel direction thereto, the amount by weight of said glass filaments ranging from about 70% to about 90%, the remainder consisting essentially of resin, the length of said granule being at least ⅛ of an inch. This invention, as noted herein above, also provides a method for preparing the injection molding concentrate as set forth above, said process comprising the steps of, (a) continuously passing a length of glass filaments (roving or strand) through a reservoir of a thermoplastic resin and impregnating said filaments with from about 10 to 30 per cent by weight of said resin, (b) passing the thermoplastic resin impregnated glass filaments to a cutting zone wherein said impregnated filaments are cut to granules at least ⅛ inch long, said cutting occurring while the strand is maintained under controlled temperature conditions.

As used in this specification and in the claims, the following terms and abbreviations are intended to have the following meanings:

a. with regard to injection molding thermoplastic granules, "long" fiberglass means glass filaments greater than ⅛ of an inch long and extending substantially the full length of the granule, whereas "short" fiberglass means glass filaments of less than ⅛ inch in length;

b. "multiplicity" when used in reference to glass fibers refers to the large numbers of individual filaments contained in the fiberglass numbers of individual filaments contained in the fiberglass strand;

c. "impregnating" as used in this specification refers to the permeation of fiberglass strand by a thermoplastic resin in such a manner that under the optimum condition each individual glass filament is coated and substantially wetted by the thermoplastic resin;

d. the term "concentrate" as used herein refers to the product of this invention.

Certain features of this invention will become apparent from the following more detailed descriptions and from the accompanying drawings in which:

FIG. I is a block flow diagram showing apparatus suitable for use in practicing one form of the process of this invention; and FIG. II is a diagramatic plan view illustrating another form of apparatus suitable for use in practicing another form of the process of this invention.

In the method as practiced with the apparatus of FIG. I, glass strands or rovings 10 (several such strands are actually employed as set forth in more specific detail in U.S. Pat. No. 3,119,718, the disclosure of which is incorporated herein by reference) are fed from suitable creels 11, through a bath shown generally at 12 which bath can be in the form of a water emulsion or solution of the thermoplastic resin or a solution of the thermoplastic resin is an appropriate solvent which impregnates the strand or roving. The strand is next passed through an oven 13 in which the water of the emulsion, or the solvent of the solution, is driven off and the resin fused. The impregnated strand after solidification of the resin is passed near a series of heaters shown generally at 14 wherein the temperature of the strand is raised, when required, to an appropriate temperature wherein it will be ready for pelletizing in unit 15. After the strand is cut as indicated, it is then screened in unit 16 to remove undesirable cut product therefrom and it is ready for packaging at station 17. Although the foregoing general process steps are descriptive of what occurs in one embodiment of the process herein, a more detailed disclosure of each of the general steps indicated above can be found in U.S. Pat. No. 3,119,718 of Jan. 28, 1964, the disclosure of which has been incorporated by reference.

Figure 1:
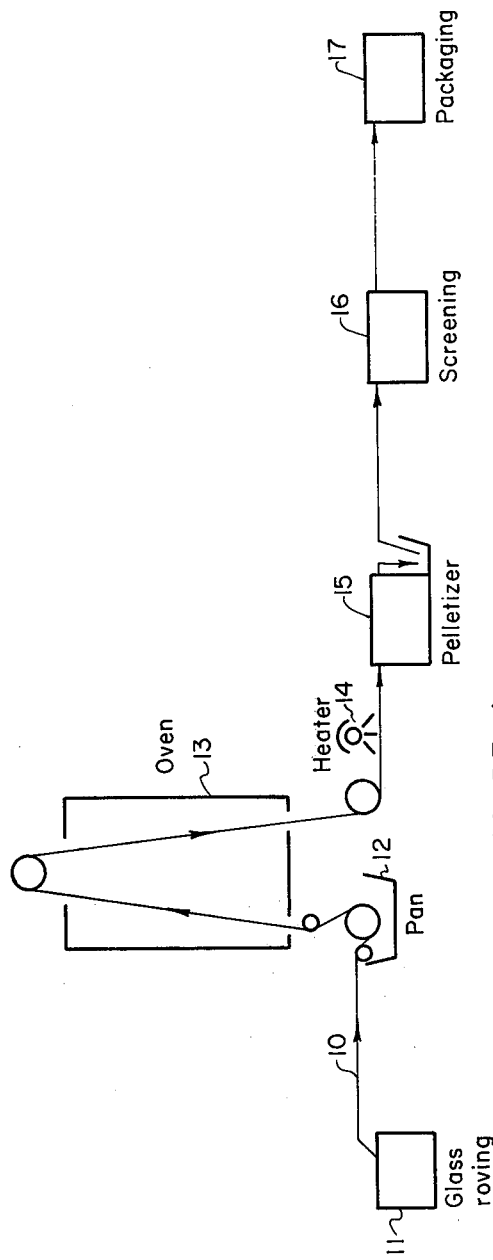

In the method as practiced with the apparatus of FIG. 2, glass strands or rovings 20, are fed from a suitable creel (not shown) and are passed through a trough 21 containing a suitable resin emulsion or solution, if a preimpregnation of the strands is necessary. As they pass through the trough, the strands or rovings are impregnated with the resin. Leaving the trough 21, the impregnated strands or rovings pass through an oven 22 in which any volatiles are driven off and the resin fused. Emerging from the oven 22, the strands or rovings pass into a chamber 23, hereinafter referred to as a reservoir, containing a supply of molten thermoplastic resin. Intermediate its length, the reservoir 23 contains a gathering die 24 which gathers the strands into a single bundle 25 which emerges from the reservoir through an orifice in alignment with the gathering die 24. After cooling in any appropriate manner, as by passage through a water bath 26 to solidify the thermoplastic resin applied in the reservoir, the bundle 25 passes between power driven feed rolls 27 which serve to draw the strands or rovings through the apparatus. After leaving the rolls 27, the bundle passes into association with a shear 28 which cuts it into short lengths to form the desired pellets or granules. When necessary, impregnated strand may be passed near a series of heaters, shown generally at 29, wherein the temperature of the strand is raised to an appropriate temperature wherein it will be ready for pelletizing in unit 28. As in the case of FIG. 1, while the above reference FIG. II refers to general process steps a more complete and detailed description of the apparatus can be had by reference to U.S. Pat. No. 3,042,570, the disclosure of which is incorporated herein by reference. It should be mentioned here that although in neither U.S. Pat. Nos. 3,119,718 or 3,042,570 is there a positive heating step shown for the impregnated strand prior to pelletizing, in order to have the strand in a condition suitable for pelletizing such a heating step can be necessary and as such can be readily provided as shown generally in FIG. I by the use of lamps such as infrared lamps or by any other suitable heating source.

The form of the strands or rovings indicated at 10 and 20 and the number thereof which are gathered together to produce a single bundle, such as 25, can vary widely depending upon a number of factors, such as the transverse dimensions of the finished pellets, relative proportions of glass and resin in the finished product, the importance of good contact between the glass filaments and the resin, convenience of manufacture, etc. For many molding compounds, each strand or roving can comprise about eight to 120 "ends." Each "end" is formed of approximately 200 individual glass filaments. Where good contact between the glass filaments and the resin is of importance, it may be desirable to reduce the number of "ends" in each strand or roving.

The apparatus used in the application of the respective resins may take different forms depending upon such factors as manufacturing convenience, the types of resins applied, and the necessary characteristics of the final product. The invention in its broader aspects is therefore not limited to any specific type of impregnating or coating apparatus. While the apparatus employing impregnators of the respective types above described has wide application, the resins might be applied by passing the strands or rovings through liquid dispersions or might be applied by melt-coaters. In some cases, it may be convenient to apply the resin through the use of a transfer or kiss roll running partially immersed in a resin bath. Where baths are used, the liquid impregnating and coating material may be in any suitable form such as an emulsion, a solution, a prepolymer, or even a monomer. In either of the latter cases, the bath may contain an appropriate polymerization catalyst and may be brought to the desired viscosity by incorporation of finely divided polymer. The viscosity of a bath will influence the amount of bath material picked up by a strand or roving passing through it.

PREFERRED EMBODIMENTS

In a preferred embodiment of this invention there is provided a process for preparing a concentrate for use in injection molding compositions, said concentrate also constituting a new composition of matter. The process for preparing the concentrate embodies certain critical steps which if not practiced will lead to failure. As can be understood from the foregoing, the art or process sought to be patented herein relates to the manufacture of a pellet which can be added with pellets of unreinforced thermoplastic resin to the feed hopper of an injection molding machine to obtain an injection molded article having vastly superior properties as compared to the unreinforced article.

The preferred method of applying thermoplastic resin to the glass fiber is a continuous method, wherein roving strands are passed through a reservoir containing an emulsion of polystyrene, for example. The strands are opened up by any suitable means prior to introduction into the reservoir of thermoplastic resin, or while immersed in the resin reservoir, and the amount of resin picked up by the strand is controlled by any one of the following:

a. speed of strand through the resin (same as residence time of strand in the resin);
b. concentration of thermoplastic in the emulsion or solution;
c. viscosity of thermoplastic emulsion, solution or melt; and
d. the degree to which the excess resin is wipped off by suitable mechanisms such as by passing the strand through a restricting orifice. Thus, the amount of resin picked up by the roving can be critically controlled by manipulation of any of the above variables.

After passage of the roving through the thermoplastic resin reservoir, it can then be passed through an oven maintained at 400° to 700° F to remove water and/or other volatiles and to fuse the resin. The specific temperatures employed in the oven will depend upon the resins employed and the means of putting them on to the fiberglass roving. When emulsions of the thermoplastic resin have been used to impregnate the fiberglass roving, considerable heat must be used to drive off the water present in the emulsion. When employing certain thermoplastic resins and particularly when these resins have been applied from solution, it may be desirable to accomplish the foregoing in two distinct steps. After passage of the roving through the thermoplastic resin solution, it can then be passed through an oven maintained at a lower temperature to remove the solvent without danger of fire or explosion from the solvent vapors. Subsequently, the strand is passed through a second oven or a higher temperature zone in the same oven maintained at 400° to 700° F in order to carry out this step of fusing the thermoplastic resin to the fiberglass roving. When melt coating of the fiberglass roving with thermoplastic is accomplished as previously described in FIG. II, the use of ovens to fuse the thermoplastic resin to the strand is not usually necessary.

Subsequent to the impregnating action described in FIG. II above, the strands or rovings can be taken from the melt impregnating zone to a cooling zone and cooled sufficiently so that the strands may be handled. Alternatively, if the impregnating action described in FIG. I above is used, the strands or rovings can be taken from the heating zone (emulsion or solution impregnation) and if required further heating can be applied to the strand (by any of the convenient heating means previously described) in order to bring the strands to proper cutting temperatures.

It is a critical feature of the process of this invention that the strands of rovings of thermoplastic impregnated fiberglass must be cut or pelletized above a certain minimum temperature if a suitable yield of acceptable pellets is to be obtained. The minimum cutting temperature for each thermoplastic impregnated fiberglass strand is not related to the amorphous or crystalline character of the thermoplastic on the strand but is routinely determined in the practice of the process. In general, it has been found that the minimum cutting temperature is 80° F. When producing short length pellets, from ⅛ inch to ¼ inch long, where shattering during pelletizing is a problem, the minimum cutting temperatures must be, in general, higher than those required to cut longer pellets, say ½ inch long. The temperature of the strand, however, must not be so high as to cause cut pellets to stick, that is, the resin must not be heated to the sticky stage. In addition, the temperature of the strand must not be so high as to cause the strand to stick to the pull rolls. When the strand is not up to the proper temperature, then acceptable pelletizing thereof does not occur and the product is a mass of shattered fiberglass and resin. It is a further critical feature of the injection molding granule concentrate herein described that the size or length of the granule must be at least ⅛ inch to ¼ inch long and preferably ⅛ of an inch long before an acceptable pellet can be obtained. When the length of the pellet is less than ⅛ to ¼ of an inch long, then the product shatters badly during pelletizing and it is not possible to produce an acceptable injection molding composition. It is further preferred in accordance with this invention that the diameter of the granule be at least about one sixteenth of an inch. Examples will be presented hereinafter to illustrate some of the points above.

The injection molding concentrate granules of this invention must possess certain minimum physical properties in order to be useful as concentrates for injection molding. These compositions must possess stiffness, that is, the impregnated strands and also be resulting pellets must be relatively stiff in order to be handled in the process and also must possess a certain "splitting" to resistance essential to the pelletizing operation and subsequently handling of the pellets. These characteristics will be further defined and illustrated by example hereinafter. The injection molding concentrate granule of this invention must possess a certain minimum pellet integrity so that they may be handled by the many varied techniques conventionally employed in the Plastics Industry, such as screw auger conveying, feeding from vibratory type hoppers, bin storage and withdrawal, drum tumbling and blending, ribbon blending, double-cone blending, or other handling methods where the pellets are subjected to impact or attrition forces.

While all references above have been made to the use of these concentrate granules in the process of injection molding, the utility thereof is not limited to such uses. For example, the concentrate granules can be suitably blended with unreinforced resins suitable for extrusion, blow molding, transfer and compression molding techniques.

The following examples are offered to illustrate further the features of this invention.

EXAMPLE 1

A series of 60 end glass roving strands were passed through a polystyrene emulsion as set forth in FIG. I. The glass roving after immersion in the emulsion was wiped and dried to leave 20 percent resin with the remaining 80 percent by weight being glass fibers. The wet roving was passed through an oven at 500° to 600° F to first drive off the water from the emulsion and then to fuse the resin around the glass roving. The resin coated strand was maintained at a temperature of about 150° F by use of infrared heaters and at this temperature was successfully chopped into pellets approximately ½ inch long. The glass fiber concentrated injection molding granules were thereafter blended with unreinforced polystyrene pellets to provide a molding composition containing a range of useful glass contents. Table III shows examples of physical properties of such blends containing 0, 20 and 35% glass reinforcement.

TABLE III

| Property | ASTM | 0% Glass | 20% Glass | 35% Glass |
|---|---|---|---|---|
| Tensile strength psi | D638-61T | 8,100 | 12,000 | 14,000 |
| Elongation, % | D638-61T | 2.2 | 2.0 | 2.0 |
| Tensile Modulus, psi | D638-61T | 460,000 | 840,000 | 1,200,000 |
| Notched Izod Impact Strength, ft.lb./in. | D256-56 | 0.3 | 1.5 | 2.5 |
| Deflection Temp. ° F at 264 psi | D648-56 | 199 | 218 | 222 |

The data in Table III illustrates the ultimate utility of the concentrates of this invention. A similar product was prepared from a styreneacrylonitrile latex under similar conditions.

Because one pound of an 80% glass reinforced concentrate is blended by the injection molder with three pounds of non-reinforced resin to produce four pounds of 20% glass reinforced mixture, the manufacture of the concentrate expends ¼ as much labor, packaging material and equipment as would be necessary to produce four pounds of 20% reinforced thermoplastic. The resultant economic savings give the injection molder a 20% glass reinforced thermoplastic at a cost of about half of that produced by the prior art. Similar cost savings can be illustrated by any of the succeeding examples.

EXAMPLE 2

A polypropylene resin was melted in an extruder and used to impregnate directly a glass roving as illustrated in FIG. II to obtain a product containing about 75 percent glass. The strands were successfully cut into pellets of about ⅜ of an inch in length while being maintained at a temperature of about 180° F. The pellets were thereafter blended with non-reinforced polypropylene to a 20% total glass content. The following physical properties wee obtained by molding this blend.

TABLE IV

| | ASTM Test | |
|---|---|---|
| Tensile Strength, psi | D638-61T | 6,000 |
| Flexural Strength, psi | D790-63 | 7,000 |
| Izod Impact, ft.lb/in. | D256-56 | 2.3 |
| Deflection Temp. at 264 psi, ° F | D648-36 | 280 |

These data were obtained using conventional homopolymer polypropylene; however, copolymer polypropylene may be similarly employed.

EXAMPLE 3

A series of 60 end glass roving strands were passed through a commercial polyurethane emulsion as set forth in FIG. I. The glass roving after emergence from the emulsion was wiped and dried to leave 20% resin with the remaining 80% by weight being glass fibers. The wet roving was passed through an oven at about 500° F to first drive off the water from the emulsion and then fuse the polyurethane resin around the glass filaments. The resin coated strand was maintained at a temperature of about 150° F and at this temperature was successfully chopped into pellets of approximately ½ inch long. The glass fiber concentrated injection molding granules were thereafter blended with unreinforced resin and molded into test specimens. Similar improved properties were observed.

EXAMPLE 4

An emulsion of high density polyethylene powder in water was prepared separately. A series of 60 end glass roving strands were then passed through this emulsion as set forth in FIG. I. The glass roving after immersion in the emulsion was wiped and dried to leave 20% resin with the remaining 80% by weight being glass fibers. The wet roving was passed through an oven at 550° F to first drive off the water from the emulsion and then to fuse the polyethylene resin around the glass filaments. The polyethylene resin impregnated strand was maintained at a temperature of about 150° F and at this temperature was successfully chopped into pellets approximately ⅛ inch long. The glass fiber concentrated injection molding granules were thereafter blended with unreinforced polyethylene pellets to provide a molding composition containing 20% glass. This molding composition was injection molded into test specimens which exhibited the following properties.

TABLE V

|  | ASTM Test |  |
|---|---|---|
| Tensile Strength, psi | D638-61T | 6,500 |
| Flexural Strength, psi | D790-63 | 8,000 |
| Izod Impact Ft. lbs/in. | D256-56 | 2.0 |
| Deflection Temp. at 264 psi, °F | D648-56 | 260 |

EXAMPLE 5

A solution of general purpose polystyrene resin in toluene as a solvent was prepared to contain approximately 5% polystyrene. A series of 60 end glass roving strands were then passed through this solution as set forth in FIG. I. The glass roving after immersion in the solution was wiped and dried to leave 25% resin with the remaining 75% by weight being glass fibers. The wet roving was passed through an oven at 400° F to first drive off the toluene from the solution and then to fuse the polystyrene resin around the glass filaments. The polystyrene resin impregnated strand was maintained at a temperature of about 150° F and at this temperature was successfully chopped into pellets approximately ⅛ inch long. The glass fiber concentrated injection molding granules were thereafter blended with unreinforced polystyrene pellets to provide a molding composition containing 20% glass. This molding composition was injection molded into test specimens which exhibited properties similar to those shown in Table III for 20% fiberglass.

As indicated herein before, the concentrate pellet must be cut at a certain elevated temperature which will vary from resin to resin but which elevated temperature is nevertheless required in order to obtain the results of this invention. Thus, for polystyrene a suitable strand temperature for cutting or pelletizing is about 80° F to about 170° F, preferrably 100° to about 160° F. The same temperature range applies to concentrates prepared from styrene-acrylonitrile copolymers (SAN). At the temperatures mentioned, the pelletizing operation can be successfully performed and yields an acceptable minimum number of split and shattered pellets. Although it is difficult to precisely indicate a suitable strand temperature for all thermoplastic resins, in general, pelletizing temperatures should be above 80° F, preferably above 90° F but below a temperature at which the cut pellets would tend to agglomerate due to sticking. Other suitable temperatures are:

For polyethylene from 90° to 140° F
For polypropylene fom 100° to 160° F
For polystyrene from 100° to 160° F Although the physical properties of the concentrates themselves in strand or pellet form would not normally be determined because the principle end use for these concentrates is to blend with non-reinforced resins, to further characterize the nature of these concentrates, the following properties have been determined. In Table VI following, the Izod impact strength of a single strand of 60 end fiberglass impregnated with polystyrene resin was determined following the general procedure and equipment specified in ASTM Test D-256-56. Obviously the sample holder was modified to support the single strand sample. As the glass content of the strand was varied, the Izod impact strength rose rapidly and then decreased as 100% glass was approached.

TABLE VI

| % Glass | Izod Impact Ft.Lbs./in. |
|---|---|
| 0 | 2.4 |
| 30 | 20 |
| 80 | 13 |
| 90 | 4 |
| 100 | 0 |

As previously indicated, the pellets of this invention must possess a certain minimum splitting resistance in order to be handled in commercial injection molding equipment. Additionally, impregnated strand as prepared in accordance with this invention must have sufficient splitting resistance to permit pelletizing. In accordance with a test arbitrarily adopted for this purpose, splitting resistance of a pellet is preferably about 100 pounds per square inch. Splitting resistance of a pellet was determined by measuring the force required to push an ordinary Embroidery No 1 sewing needle through a diameter of the pellet at a rate of 0.1 inches per minute. The force was measured on a standard Instron Tester and the value was divided by the cross sectional area of the pellet to put the values on the same basis. Polystyrene impregnated pellets were used for all of this work. All samples containing glass split down the length of the pellet, as would be expected, due to the oriented fibers. However, the 0% glass (unreinforced polystyrene) pellets split perpendicular to the length at the point of penetration as would be expected since there is no glass and it would split in the weakest direction. Each value represents the average of about 15 individual determinations.

Data were:

TABLE VII

| % Glass | Splitting Resistance lb./in. |
|---|---|
| 0 | 2,700 |
| 30 | 1,600 |
| 80 | 900 |
| 90 | 180 |
| 100 | 0 |

It will thus be seen that in order to obtain the improved compositions of this invention that various critical factors must be met and that each such factor contributes to the overall success of the invention.

The foregoing examples also establish, it is firmly believed, thay any thermoplastic resin can be used in the process of this invention. Such thermoplastic resins include polystyrene, the acrylic resins, acrylonitrile-butadiene-styrene (ABS) resins, polyvinyl chloride resins, polyformaldehyde resins, polysulfone resins, polyphenylene oxide resins, polyamide resins such as nylon, polyester resins, polyolefin resins, polycarbonate resins, and many others.

The rovings or glass strands used in this invention can be sized with many commercially available sizes such as polyesters, polyvinyl-acetates and/or coupling agents of the silane or chrome-complex type.

We claim:

1. A blending concentrate of glass filaments uniformly predisposed in highly oriented relationship in a thermoplastic resin and having the form of generally rod-shaped granules of at least ⅛ inch in length said granules being combinable by simple mixing with substantial quantities of unreinforced thermoplastic resin pellets to form dry free-flowing compositions which, on hot molding or shaping, yield superior reinforced articles, said concentrate consisting essentially of about 70 to 90% by weight of glass filaments and about 30 to 10% by weight of a thermoplastic resin chosen from the group consisting of polystyrene, styrene-acrylonitrile copolymer, polyethylene, polypropylene, polycarbonate, polyamide and polyester with a multiplicity of glass filaments extending in essentially parallel alignment throughout the length of each individual granule of said concentrate.

2. A blending concentrate as in claim 1 wherein said granules are generally at least ¼ inch in length.

3. A free flowing thermoplastic resin based composition readily thermoformable into a finished article of high strength comprising a dry blend of the concentrate of claim 1 with a sufficient quantity of pellets of the same unreinforced thermoplastic resin contained in said concentrate to bring the glass filament content of said composition into the range of about 20 to about 35% by weight.

4. The composition of claim 3 wherein the granules of which said concentrate is composed are largely between ¼ and ½ inch in length.

5. A composition according to claim 3 wherein the thermoplastic resin is polystyrene.

6. A composition according to claim 3 wherein the thermoplastic resin is styrene-acrylonitrile copolymer.

7. A composition according to claim 3 wherein the thermoplastic resin is polyethylene or polypropylene.

8. A process for preparing a superior, granular, blending concentrate containing an unusually high level of reinforcing glass filaments arranged in a highly oriented disposition in a thermoplastic resin matrix comprising:
   a. continuously passing a plurality of longitudinally aligned glass filaments through a zone containing a liquid pool of thermoplastic resin chosen from the group consisting of polystyrene, styrene-acrylonitrile copolymer, polyethylene, polypropylene, polycarbonate, polyamide and polyester,
   b. continuously impregnating said glass filaments with the thermoplastic resin in said zone at a resin to glass ratio of between about 1 to 9 and about 3 to 7 by weight,
   c. continuously withdrawing the resin impregnated glass filaments from said zone and forming same into a unitary elongate solid mass wherein said glass filaments extend in substantially parallel alignment with the longitudinal dimension of said elongate solid mass, and
   d. passing the unitary continuous elongate solid mass to a cutting zone and maintaining said mass at a somewhat elevated temperature of at least 80° F while cutting same transversely into short lengths of at least ⅛ inch so that neat free-flowing rod-shaped granules are formed without substantial longitudinal splitting.

9. The process of claim 8 wherein said thermoplastic resin is polystyrene and the elevated temperature in step (d) is at least 100° F.

10. The process of claim 8 wherein said thermoplastic resin is polypropylene and the elevated temperature in step (d) is at least 100° F.

11. The process of claim 8 wherein said thermoplastic resin is polyethylene and the elevated temperature in step (d) is at least 90° F.

12. A process according to claim 8 wherein said solid mass is maintained at a temperature of at least 90° F while being cut during step (d).

13. A process according to claim 8 wherein said liquid pool in step (a) comprises an aqueous emulsion or suspension of said thermoplastic resin.

* * * * *

UNITED STATES PATENT AND TRADEMARK OFFICE
CERTIFICATE OF CORRECTION

PATENT NO. : 4,037,011
DATED : July 19, 1977
INVENTOR(S) : Kiyoshi Hattori; Edward L. Lowery; William H. Chadbourne; William M. Boyer It is certified that error appears in the above-identified patent and that said Letters Patent are hereby corrected as shown below:

Replace Table I of the printed Patent with the corrected Table I as shown below:

TABLE I

| Property | Unit | ASTM Test | Unreinforced Nylon 6,6 | 40% fiberglass reinforced Nylon 6,6 | Unreinforced Polystyrene |
|---|---|---|---|---|---|
| Tensile Strength | PSI | D638-61T | 11,800 | 30,000 | 7,500 |
| Elongation | % | D638-61T | 60 | 2.2 | 3.0 |
| Tensile Modulus | $PSI \times 10^5$ | D638-61T | 4.5 | 20 | 4.6 |
| Izod Impact | Ft.lbs/in. | D256-56 | 1.0 | 3.4 | 0.5 |
| Deflection Temp. Under Load at 264 psi | °F | D648-56 | 150 | 500 | 180 |
| Linear Coefficient of Termal Expansion | In/in °F | D696-44 | $4.5 \times 10^{-5}$ | $1.4 \times 10^{-5}$ | $4 \times 10^{-5}$ |

UNITED STATES PATENT AND TRADEMARK OFFICE
CERTIFICATE OF CORRECTION

PATENT NO. : 4,037,011
DATED : July 19, 1977
INVENTOR(S) : Kiyoshi Hattori; Edward L. Lowery et al It is certified that error appears in the above-identified patent and that said Letters Patent are hereby corrected as shown below:

TABLE I (continued)

| Property | 35% fiberglass reinforced Polystyrene | Unreinforced Polyethylene (high density) | 40% fiber glass reinforced Polyethylene | Zinc | METALS Aluminum | Magnesium |
|---|---|---|---|---|---|---|
| Tens. Str. | 15,000 | 4,200 | 11,000 | 41,000 | 33-47,000 | 34,000 |
| Elong. | 1.2 | 800 | 3.5 | 10 | 4-9 | 3 |
| Tens. Mod. | 19 | 1.4 | 9.0 | (creeps) | 103 | 65 |
| Izod | 2.2 | 2.0 | 4.0 | - | - | - |
| Deflect. Temp. | 220 | 175 (at 66 psi) | 260 | - | - | - |
| Linear Coeff. of Expans. | $1.8 \times 10^{-5}$ | $6 \times 10^{-5}$ | $1.7 \times 10^{-5}$ | $1.5 \times 10^{-5}$ | $1.2 \times 10^{-5}$ | $1.4 \times 10^{-5}$ |

UNITED STATES PATENT AND TRADEMARK OFFICE
CERTIFICATE OF CORRECTION

PATENT NO. : 4,037,011
DATED : July 19, 1977
INVENTOR(S) : Kiyoshi Hattori, et al It is certified that error appears in the above-identified patent and that said Letters Patent are hereby corrected as shown below:

Line 33, column 9 delete the word --"to"-- appearing after "splitting".

Signed and Sealed this

Tenth Day of January 1978

[SEAL]

Attest:

RUTH C. MASON
Attesting Officer

LUTRELLE F. PARKER
Acting Commissioner of Patents and Trademarks